United States Patent
Hoekstra-Suurs (10) Patent No.: US 12,490,747 B2
(45) Date of Patent: Dec. 9, 2025

(54) FOOD PRODUCT THERMAL TREATMENT METHOD

(71) Applicant: MAREL FURTHER PROCESSING B.V., Boxmeer (NL)

(72) Inventor: Patricia Hoekstra-Suurs, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 637 days.

(21) Appl. No.: 17/773,189

(22) PCT Filed: Nov. 11, 2020

(86) PCT No.: PCT/NL2020/050711
§ 371 (c)(1),
(2) Date: Apr. 29, 2022

(87) PCT Pub. No.: WO2021/096358
PCT Pub. Date: May 20, 2021

(65) Prior Publication Data
US 2022/0369654 A1 Nov. 24, 2022

(30) Foreign Application Priority Data
Nov. 11, 2019 (NL) ....................... 2024207

(51) Int. Cl.
*A22C 13/00* (2006.01)
*A23B 4/005* (2006.01)

(52) U.S. Cl.
CPC ........ *A22C 13/0006* (2013.01); *A23B 4/0053* (2013.01)

(58) Field of Classification Search
CPC ............ A22C 13/0006; A22C 13/0016; A23B 4/0053

(Continued)

(56) References Cited

U.S. PATENT DOCUMENTS 3,622,353 A 11/1971 Bradshaw et al.
2017/0224161 A1 8/2017 Li et al.

FOREIGN PATENT DOCUMENTS

CN 101595999 A 12/2009
CN 106455863 A 2/2017

(Continued)

OTHER PUBLICATIONS

International Search Report and Written Opinion from corresponding PCT Application No. PCT/NL2020/050711, Feb. 10, 2021.

(Continued)

*Primary Examiner* — Subbalakshmi Prakash
(74) *Attorney, Agent, or Firm* — Workman Nydegger (57) ABSTRACT

A method is provided for thermal treating a food product in a thermal treatment unit with the food product having a casing comprising a protein, or hybrid casing. The method involves providing the food product, subjecting the food product to a brine solution, conveying the food product into the unit, and subjecting the food product to a thermal treating step. The thermal treating step includes at least: a) drying the food product, and b) subsequently, further thermal treating the food product. The method further involves: determining the denaturation temperature of the protein, and setting the parameters of the climate in the unit such that the dew point of the air of the unit is equal to or lower than the determined denaturation temperature, wherein step a) ends in case the surface temperature of the casing is equal to the dew point of the air of the unit.

17 Claims, 7 Drawing Sheets

(58) Field of Classification Search
USPC .......................................................... 426/277
See application file for complete search history.

(56)  References Cited

FOREIGN PATENT DOCUMENTS

| | | |
|---|---:|---|
| DE | 140972 A1 | 4/1980 |
| JP | 2018162891 A | 10/2018 |
| NL | 6909339 A | 12/1969 |
| WO | 2015/142167 A1 | 9/2015 |
| WO | 2015185404 A1 | 12/2015 |
| WO | 2017083292 A1 | 5/2017 |
| WO | 2018/016954 A1 | 1/2018 |
| WO | 2021096358 A1 | 5/2021 |

OTHER PUBLICATIONS

Search Report and Written Opinion from corresponding Dutch Application No. NL2024207, Jun. 25, 2020.
Search Report from corresponding Chinese Application No. 202080073282.1, Apr. 4, 2023.
Office Action from corresponding Chinese Application No. 202080073282.1, Apr. 14, 2023.
Li Yunfei, "Principles of Food Engineering", China Agricultural University Press, Aug. 2002, p. 788.
Chinese Office Action from Corresponding Chinese Patent Application No. CN2020800732821, Jul. 25, 2023.
Chinese Office Action in corresponding Chinese Application No. 2020800732821 on Aug. 18, 2022.

|  | Step 1 | Step 2 | Step 3 |
|---|---|---|---|
| Time (min) | 40 | 15 | $T_{core}$ = 74°C |
| $T_{db}$ (°C) | 74 | 77 | 82 |
| X (g/ kg) | 5 | 95 | 200 |
| $T_{dew}$ (°C) | 3.9 | 51.7 | 64.7 |
| $V_{air}$ (m/s) | 4 | 4 | 4 |

| | Step 1 | Step 2 | Step 3 | Step 4 | Step 5 | Step 6 | Step 7 |
|---|---|---|---|---|---|---|---|
| Time (min) | 5 | 5 | 5 | 5 | 5 | 5 | $T_{core}$ = 74°C |
| $T_{db}$ (°C) | 74 | 76 | 78 | 80 | 82 | 84 | 86 |
| X (g/kg) | 5 | 11 | 20 | 37 | 65 | 110 | 200 |
| $T_{dew}$ (°C) | 3 | 15 | 25 | 35 | 45 | 55 | 65 |
| $V_{air}$ (m/s) | 4 | 4 | 4 | 4 | 4 | 4 | 4 |

|  | Step 1 | Step 2 | Step 3 | Step 4 |
|---|---|---|---|---|
| Time (min) | 5 | 5 | 5 | $T_{core}$ = 74°C |
| $T_{db}$ (°C) | 77 | 80 | 83 | 86 |
| X (g/ kg) | 20 | 49 | 86 | 200 |
| $T_{dew}$ (°C) | 25 | 40 | 50 | 65 |
| $V_{air}$ (m/s) | 4 | 4 | 4 | 4 |

FOOD PRODUCT THERMAL TREATMENT METHOD

BACKGROUND

The present invention relates to a method for thermal treating a food product in a thermal treatment unit. In particular, the present invention relates to a method for treating a food product in a thermal treatment unit, the food product having a casing comprising a protein, or a hybrid casing of a protein and a polymer.

Food products having a casing layer comprising a protein, such as collagen, are generally known and described in, among others, Dutch patent NL 6909339. This document describes the co-extrusion of food products having a co-extruded strand of food dough and a casing enclosing the strand of food dough into a flow of co-extruded food product. Following extrusion, the coated strand is typically guided for strengthening purposes through a coagulation bath. Under the influence of the coagulation solution the protein coagulates and/or precipitates and the casing layer of the flow of co-extruded food product is strengthened. A strand of food dough is thus formed which is at least partially coated with a strong casing layer of protein, e.g. collagen.

A drawback of the known methods is that the characteristics of the casing material, and therefore the processability of the food product, may change during the treatment of the food product, e.g. a flow of co-extruded food product including a flow of individual sausages, a strand of food products or a flow of sausages connected to each other (head-tail connections). The change in the characteristics of the casing material is difficult to predict. Even further, the change in the characteristics of the casing material is irreversible. Therefore, once the characteristics of the casing material have been changed the food product can no longer be processed to obtain a final food product, e.g. a sausage, having an acceptable quality.

A particular drawback of the known methods using protein or protein comprising viscous gelling agents, as a casing material for the co-extrusion of elongated food products, are the uncontrolled properties (especially the surface conditions) of the final food product. It has been observed that by changing the process settings after co-extrusion of the strand of food dough and the casing material, the characteristics of the protein casing material may irreversibly change. This change may include the change of surface characteristics of the casing material with regard to smoothness of the surface of the food product, e.g. the "look-and-feel" of the food product. By changing the process settings after co-extrusion in subsequent processing steps, such as brining, separating, crimping, smoking, drying, packaging, cooking and/or chilling of the food product, the obtained food product may, different from the normally desired smooth, nice looking and stable surface, uncontrolled change into a food product with undesired surface conditions, such as sticky, inconsistent and/or smudgy surfaces. Such uncontrolled irreversible change in surface characteristics results in less processability of the food product and, as a consequence, the food product (or a complete flow of food products) may even have to be discarded.

In view of the above there is a need to enhance the control of the production of a food product having a casing comprising a protein, or a hybrid casing of a protein and a polymer.

Further, despite the need to enhance the control of the production of a food product having a casing comprising a protein, or a hybrid casing of a protein and a polymer, there is a desire to produce a food product closely resembling the natural 'bite' of a natural casing, such as a sheep casing or the like.

Even further, there is a need of reducing the thermal treatment time of the food product, in particular the drying time needed to dry a food product having a casing comprising a protein, or a hybrid casing of a protein and a polymer, without negatively influencing the characteristics of the food product during manufacturing/processing of the food product as well as the characteristics of the final food product, i.e. after completion of the method of manufacturing the food product.

SUMMARY

In order to meet one or more of the above identified needs and desires, the present invention provides a method for thermal treating a food product in a thermal treatment unit, the food product having a casing comprising a protein, or a hybrid casing of a protein and a polymer, wherein the method comprises the steps of:
  providing the food product;
  subjecting the food product to a brine solution;
  conveying the food product into the thermal treatment unit; and
  subjecting the food product to a thermal treating step.

The thermal treating step of the present invention may comprise a plurality of distinct thermal treating steps, however, for the method of the present invention the thermal treating step comprises at least the steps of:
  a) drying the food product; and
  b) subsequently, further thermal treating the food product.

The method of the present invention further comprises the steps of:
  before conveying the food product into the thermal treatment unit, determining the denaturation temperature of the protein comprised in the casing of the food product; and
  setting the parameters of the climate in the thermal treatment unit such that the dew point of the air of the thermal treatment unit is equal to or lower than the determined denaturation temperature of the protein comprised in the casing of the food product.

DESCRIPTION OF METHOD

Drying the food product and subsequently further thermal treating the food product are consecutive steps, wherein the step of drying the food product ends in case the surface temperature of the casing is equal to the dew point of the air of the thermal treatment unit. It was found that the above identified needs and desires are met in case, at least during the drying step of the food product, the parameters of the climate in the thermal treatment unit are selected such that the end of the drying step can be more precisely and more accurately defined based on the surface temperature and the dew point based on the denaturation temperature of the protein comprised in the casing of the food product determined when before, preferably shortly before, entering the thermal treatment unit.

It was found that by selecting the parameters of the climate in the thermal treatment unit such that the dew point of the air of the thermal treatment unit is equal to or lower than the determined denaturation temperature of the protein comprised in the casing of the food product and wherein significant temperature changes, i.e. raising the temperature in the thermal treatment unit, are made by the time the surface temperature of the food product equals the dew point temperature of the climate, the physical state of the protein comprised in the casing is controlled in a sustainable, robust and reciprocal manner such that the smoothness of the surface of the casing can be controlled during the manufacturing of the food product. In particular it was found that by controlling the moment of finalizing the drying phase of the thermal treatment before entering more rigorous thermal treatment conditions during the further thermal treating of the total food product, the total time for drying the food product, and thus the total time for thermal treating the food product as such can be significantly reduced compared to the typical drying methods described in the art. Also, it was found that although the total time for drying the food product can be significantly reduced by using the method of the present invention, the natural 'bite' and product behaviour of the final food product more closely resembles the 'bite', 'look-and-feel' and product behaviour of a food product comprising a natural casing, such as a sheep casing.

Given the method of the present invention, by providing a thermal treating step wherein the surface temperature equals the dew point temperature, which dew point temperature is based on (i.e. equal to or lower than) the denaturation temperature of the protein comprised in the casing, at the transition point from the drying phase to the further thermal treatment phase (e.g. partially cooking or fully cooking the food product), the physical state of the protein is controlled in a more sustainable and reliable way, i.e. to produce a dried food product with appealing characteristics, e.g. a product with a smooth, non-sticky, non-smudgy surface having good texture properties.

With regard to the physical state of the protein, it is noted that such physical state may include three types of physical states: the crystalline phase, the helical phase and the randomly coiled phase. It was found that the irreversible change in casing characteristics is expected in case a protein in the helical or crystalline form is converted into a protein having a randomly coiled form. The protein comprising casing of the food product comprising a protein in the helical or crystalline form is characterized by a smooth, attractive looking and/or stable surface, whereas the protein comprising casing of the food product comprising a protein in the randomly coiled form exhibits a more sticky, inconsistent and/or smudgy surface. As a consequence, in an embodiment of the method of the present invention, the protein is in the helical and/or crystalline form.

In an embodiment of the present invention, during performance of the method of the present invention the physical state of the protein may vary between the helical and crystalline form during the thermal treating step, preferably at least during the drying phase of the thermal treating step. Since either the helical or crystalline physical state of the protein have a positive effect onto the casing characteristics of the food product, the actual state of the protein may vary between those two states. However, it is in particular preferred that the physical state of the protein does not change after formation (e.g. co-extrusion) of the food product. To maintain the same product characteristics, such as surface smoothness, surface colour, cooking characteristics of the obtained food product, or the like, it is in particular advantageous to maintain the same physical state of protein during the co-extrusion of the food product and any further processing step. Even further, particular good results are obtained with a protein that is in the crystalline form throughout the method of the present invention. By providing a casing comprising a protein that is in the crystalline form, the casing of the food product has the most optimal thermal stability, i.e. providing a product that can be processed without having undesired surface characteristics, e.g. like 'melting' of the casing during the drying phase or the like.

The physical state of the protein comprised in the casing may be controlled using different parameters during the processing of the co-extruded food product including parameters like pH, temperature, salt type used and salt concentration in the salt solutions (e.g. brine solution and/or liquid smoke). Given the parameters for controlling the physical state of the protein comprised in the casing, it is noted that the parameter temperature is often a given, less controllable and gradually changing parameter. Also, the salt type and salt concentration used in the salt solutions during processing the co-extruded food product are often given parameters and may only gradually change during the course of the process. Radically changing the salt type or salt concentrations is often only possible during maintenance procedures wherein the continuous production of co-extruded food products has been interrupted enabling the operator to set the parameters of a subsequent continuous procedure for processing co-extruded food products.

It was found that by controlling the pH during each phase (or at least the critical phases) of the method for processing co-extruded food products, the physical state of the protein comprised in the casing can be controlled in a sustainable and comprehensive manner. Critical steps may include process steps wherein the food products are pre-strengthened (short brine), strengthened (long brine) and/or coloured (applying liquid smoke onto the casing). Further, another critical step may include the extrusion of the casing itself, i.e. controlling the pH of the viscous gelling agent comprising the protein, such as collagen, before, during or shortly after application as a casing onto a string of food dough to form the co-extruded food product of the present invention.

It was further found that by controlling the pH of the casing throughout the method of producing the food product of the present invention, the other parameters may be less critical and may be varied within a broader range. The present invention thus provides a method wherein the starting conditions of the climate in the thermal treatment unit do not need further significant adjustment before starting the thermal treating step of the present invention, i.e. there is no need to perform costly climate control procedures such as, for example, reducing the humidity of the climate in the thermal treatment unit before starting the thermal treatment of the food product. It was found that, irrespective the humidity and temperature of the climate in the thermal treatment unit, the method of the present invention provides a robust and reciprocal way to adjust the parameters, e.g. by, for example, adjusting the velocity of the air, of the climate of the thermal treatment unit in order to achieve a food product having optimal processability and stability. Also, by (continuously) changing climate conditions of the thermal treatment unit, due to external influences and/or due to food products influencing the climate of the thermal treatment unit during condensing and drying of the food products, the same food product characteristics can be obtained by (continuously) adjusting the parameters of the climate of the thermal treatment unit without the need of controlling and to maintain the climate conditions of the thermal treatment unit during the performance of the thermal treating step of the present invention.

Although the operator has several parameters to adjust the climate of the thermal treatment unit in order to end up with a climate having a dew point temperature that is equal to or lower than the determined denaturation temperature of the protein comprised in the casing, the operator, being a person skilled in the art, is able to calculate and to adjust the parameters of the climate based on the given climate conditions in order to provide a food product having a casing comprising a protein, or a hybrid casing of a protein and a polymer with good product characteristics and continuous processability. It is further noted that it was found that the operator has to select the parameter of the climate such that the dew point temperature does not exceed the determined denaturation temperature of the protein. It was found that in situations wherein the dew point temperature exceeded the determined denaturation temperature of the protein comprised in the casing, the occurrence of gelatinization (also called 'melting') of the protein in the casing was highly increased resulting in an uncontrolled, less cost-efficient and less time-efficient thermal treatment method.

The protein of the present invention may be selected from the group consisting of edible proteins able to form a casing by gelling (coagulation and/or precipitation; whether or not in the presence of a coagulating agent) after co-extrusion. A particular preferred protein comprises collagen. It is further noted that the term 'protein' as used herein may refer to one single type of protein but may also include different types of proteins. Consequently, in case the casing comprising a protein wherein the protein comprises more than one type of protein, the denaturation temperature as used herein may refer to a denaturation temperature range rather than a denaturation temperature point as it is likely to be measured in case the casing comprises one single type of protein.

The polymer comprised in the hybrid casings of the present invention may be selected from the group consisting of edible polymers able to form a casing in combination with the protein present in the hybrid casing. Preferably the polymer is selected from the group consisting of polysaccharides. A preferred polymer may comprise alginate and/or cellulose.

As already indicated above, the thermal treating step of the method of the present invention may comprise a plurality of separate treating steps. In addition to the above-identified drying step, the further thermal treating step may include one or more subsequent thermal treating steps. For example, the one or more subsequent thermal treating steps may be selected from the group consisting of heating, partially cooking, cooking, chilling, and cooling the food product. The further thermal treating step may be performed in the same thermal treatment unit, which thermal treatment unit may also perform the drying step. However, given the possible significant changes in temperatures between the different thermal treating steps, the further thermal treating step may be performed in a subsequent thermal treatment unit or at least in separate compartments of the same thermal treatment unit as defined in the method of the present invention.

In a particular preferred embodiment of the present invention, the further thermal treating step may comprise the cooking of the food product. It was found that by providing the drying process of the present invention and by defining the end point of the drying process based on the denaturation temperature of the protein comprised in the casing of the food product, the transition from the drying phase to the cooking phase of the food product can be identified as a distinct tipping point. In which tipping point the thermal conditions are rigorously changed. That is from a drying phase into a cooking phase having harsh heating characteristics without affecting the product characteristics of the casing of the food product.

As used herein the term "heating" refers to a process step wherein the casing coagulates, although the food dough is not cooked.

As used herein the term "partially cooking" refers to a process step wherein the food dough is cooked only partially, i.e. resulting in a food product not yet readily edible; still needs to be cooked further, e.g. in a further post-multiphase treating step or by the end user during preparing the food product for eating.

As used herein the term "cooking" refers to a process step wherein the food dough is cooked resulting in a food product which is edible. An alternative term for a food product subjected to a cooking step is a "fully cooked" food product. Depending on different legislation per country, the term "fully cooked" is subject to different interpretations. In this respect it is noted that a "fully cooked" food product is a food product of which the temperature of the core of the food dough has reached the temperature as defined by a legislator for the country the food product is produced for. For example, in the Netherlands a "fully cooked" food product is defined by a temperature of the core of the food dough of at least 72° C.

As used herein the term "cooling" refers to a process step wherein the temperature of the food product is reduced using a cooling medium, such as tap water typically having a temperature of about 10° C. to 15° C. or cold air.

As used herein the term "chilling" refers to a process step wherein the food product is subjected to a chilling medium, which is a medium (e.g. water), which is deliberately made colder.

The method of the present invention may further comprise the step of:
    after the thermal treating step, subjecting the food product
        to a post-thermal treating step.

Such post-thermal treating step may be selected from the group consisting of chilling, surface treating, cooking and packing the food product. Another post-thermal treatment may comprise the step of cooking the food product, in particular the step of cooking the food product after packing the food product. Such so-called 'cook-in-pack' method that has been found in particular beneficial is combining packing and fully cooking the food product. The post-thermal treatment of step may also include surface treating the food product by subjecting the food product to steam, i.e. antimicrobial treatment of the surface of the flow of food products.

The parameters of the climate of the thermal treatment unit may be selected from a great variety of possible relevant parameters relevant for applying a drying phase to the food product during the thermal treating step of the present invention. However, the most relevant parameters to be selected may include the dry bulb temperature, wet bulb temperature, relative humidity, absolute humidity, and air velocity of the climate.

The denaturation temperature of the protein comprised in the casing of the food product may be preferably determined by performing a differential scanning calorimetry (DSC) measurement. Additionally, the physical state of the protein comprised in the casing may be monitored by measuring the isoelectric current of the casing. Alternatively, the physical state of the protein comprised in the casing may be monitored by measuring the pH of the casing using a suitable pH indicator. For example, a suitable pH indicator may be a methyl red bromocresol green indicator.

The parameters of the climate may be predetermined based on the climate conditions of the thermal treatment unit in advance of performing the thermal treating step. In addition or alternatively, the parameters of the climate may be adjusted based on changing climate conditions of the thermal treatment unit during performance of the thermal treating step, preferably during condensing the food product. Further, the parameters of the climate may be adjusted based on a changing denaturation temperature of the protein comprised in the casing of the food product during performance of the method. Such change may be caused by the changing conditions of any pre-thermal processing step in preparing the food product provided for thermal treatment.

The climate conditions of the thermal treatment unit are preferably measured by using one or more sensors suitable for measuring the relevant parameters of the climate, i.e. the dry bulb temperature, wet bulb temperature, relative humidity, absolute humidity, and air velocity. Such dry bulb temperature sensors, wet bulb temperature sensors, humidity sensors, and air velocity sensors may be used for adjusting (optionally automatically) the parameters.

The food product provided in the method of the present invention may be a food product produced by co-extrusion of a food dough and a casing material selected from a casing having a casing comprising a protein, or a hybrid casing of a protein and a polymer. In a preferred embodiment of the present invention, the step of providing the food product comprises the step of:
  i) co-extruding a strand of food dough and a casing enclosing the strand of food dough into a flow of co-extruded food product; and
  ii) subjecting the flow of co-extruded food product to a food product strengthening step, wherein the food product strengthening step comprises the step of subjecting the flow of food products to a brine solution.

In addition, the step of providing the food product may further comprise the step of:

before subjecting the flow of co-extruded food product to step ii), separating the flow of co-extruded food product into individual food products, preferably separating the flow of co-extruded food product obtained in step i).

Even further, the step of providing the food product may further comprise the step of:
  after subjecting the flow of co-extruded food product to step ii), applying liquid smoke to the flow of co-extruded food product.

In an embodiment of the present invention, the step of determining the denaturation temperature of the protein comprised in the casing of the food product may be performed after subjecting the flow of co-extruded food product to step ii), preferably after the step of applying liquid smoke to the flow of co-extruded food product.

EXAMPLES

Figure 1:
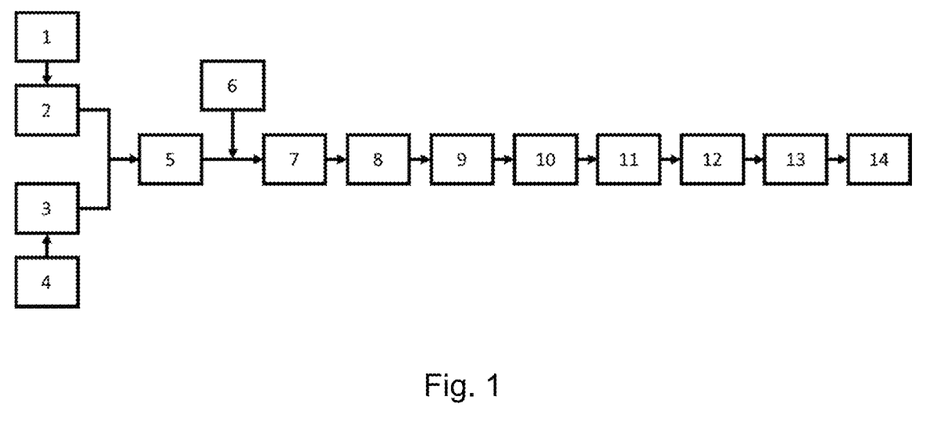
FIG. 1 is a flow chart showing a general method according to the invention.

Food products were prepared via the schematic process described in FIG. 1. In the schematic process provided in FIG. 1, meat 1 and collagen gel 4 was provided to a meat stuffer 2 and collagen stuffer 3, respectively. The meat 1 and collagen gel 4 is subsequently provided via the meat stuffer 2 and the collagen stuffer 3 to an extruder 5 for extruding a food product string of meat dough encased by a collagen casing. Before providing the extruded food product string to a crimper 7 salt (i.e. a brine comprising a saturated sodium chloride solution) 6 was sprayed onto the surface of the food product string for initial hardening of the casing before converting the food product strand into individual links by crimping. After crimping the food product string into individual food products (sausages) the food products were subjected to a short brining step 8 (2 seconds using a saturated sodium chloride solution) and a long brining step 9 (30 to 60 seconds using a 52% potassium lactate solution) in order to raise the pH of the casing above pH 5 (above the isoelectric point of collagen) and below the second critical point in the behaviour of collagen at a pH of about 7.5, thereby bringing the collagen structure of the casing in a preferred physical state. The long brining step 9 is subsequently followed by a step 10 of applying liquid smoke to the casing of the food products. Optionally, not visualized in FIG. 1, before performing step 10, the food product may be rinsed (shortly during 2 seconds) in water for the removal of excess of brine from the casing of the food product. Alternatively or in addition, such rinsing step may be performed after performing the liquid smoke step 10. Subsequently, in step 11 the food products were conveyed to a cart having rotating baskets for placement in an Alkar Batch house 12. After performing the method of the present invention in step 12, the food products were cooled on a tray in the fridge at 4° C. (step 13) and subsequently packed 14.

Figure 2:
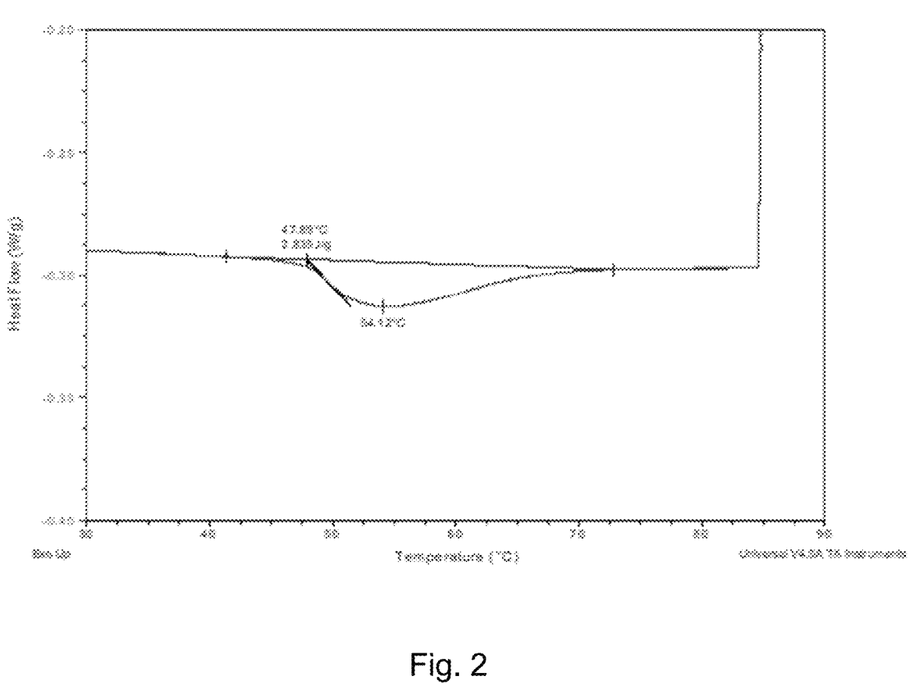
FIG. 2 is a graph showing the denaturation temperature using potassium lactate in a long brining step.

In order to apply the most optimal climate conditions in step 12, i.e. drying and optional cooking of the food products, the denaturation temperature of the collagen casing of the food product was measured (after brining of step 9) by using differential scanning calorimetry (DSC). An example of such DSC measurement is shown in FIG. 2. Given the results provided in FIG. 2, the dew point temperature of the air of the thermal treatment unit (i.e. the climate of step 12) was set at 47.9° C.

As discussed below in the three exemplary trials, the thermal treatment may alternatively involve a time step increase in dew point temperature versus humidity of the thermal treatment in the climate step. It was found that different results occur depending on initial and stepped dew point temperature increases, and the time the food product is subjected to a dew point temperature in a time step, thereby assuring the dew point of the air of the thermal treatment unit is equal to or lower than the determined denaturation temperature of the protein comprised in the casing of the food product in the climate step.

Given the denaturation temperature provided in FIG. 2 (using potassium lactate as long brining step 9), it was further noted that the use of a different salt during brining step 9 resulted in different denaturation temperatures, and thus different dew point temperatures in order to provide the most optimal thermal treatment step (i.e. drying) of the food product. Examples of the different denaturation temperatures are provided in FIG. 3, wherein the DSC diagrams are provided for different long brining steps 9 including the following salt solutions:

magnesium sulphate (FIG. 3A): 40.2° C.;
sodium chloride (FIG. 3B): 42.1° C.;
dipotassium phosphate (FIG. 3C): 41.5° C.

It was found that subjecting the food product to a potassium lactate brine solution advantageously prepares the collagen over the other salt solutions mentioned above due at least in part to the elevated denaturization temperature of the collagen over the examples of other brining solutions. Specifically, subjecting the collagen to a potassium lactate brine solution begins to dry the collagen casing prior to the climate step 12. The potassium lactate brine solution initiates an osmosis process extracting water from the collagen casing and preconditions the collagen casing by managing the pH level in the collagen casing to a suitable isoelectric point for the collagen casing to suitably release water when in the climate step 12. Such benefits can attribute to better adhesion of the collagen casing to the food product during the drying process and reduce the risk of blistering of the collagen casing during drying.

Figure 3A:
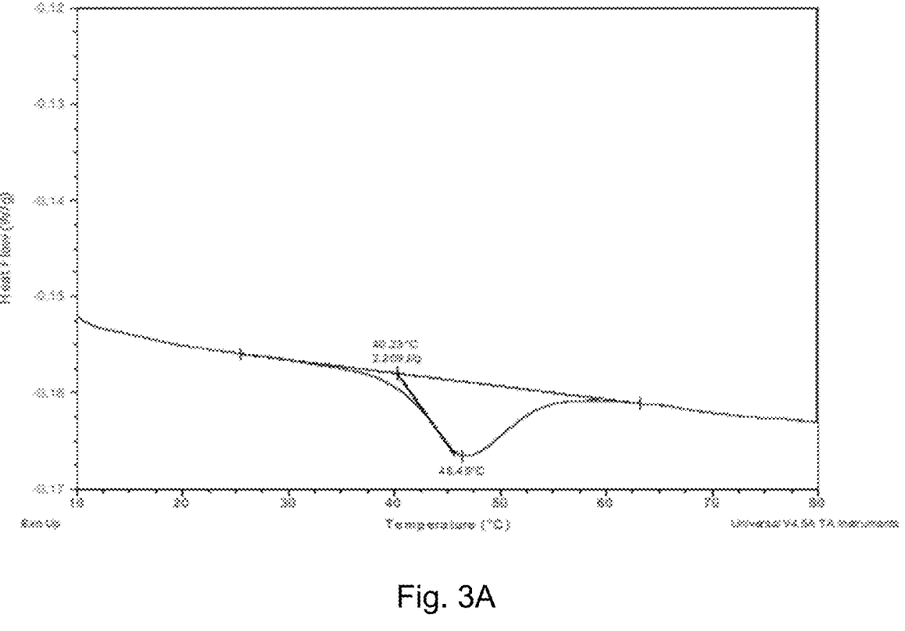
FIG. 3A is a graph showing the denaturation temperature using magnesium sulphate in a long brining step.
Figure 3B:
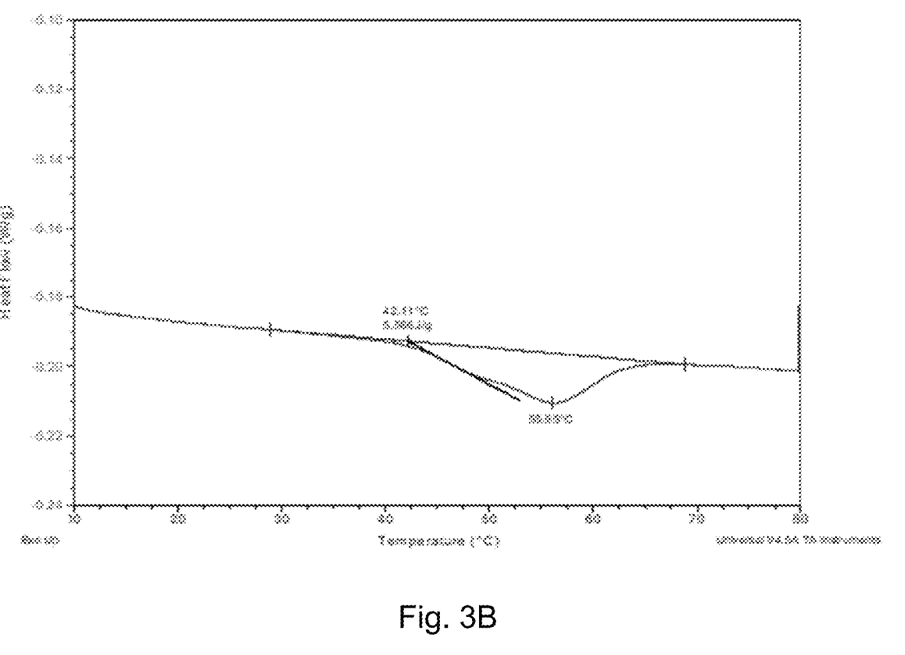
FIG. 3B is a graph showing the denaturation temperature using sodium chloride in a long brining step.
Figure 3C:
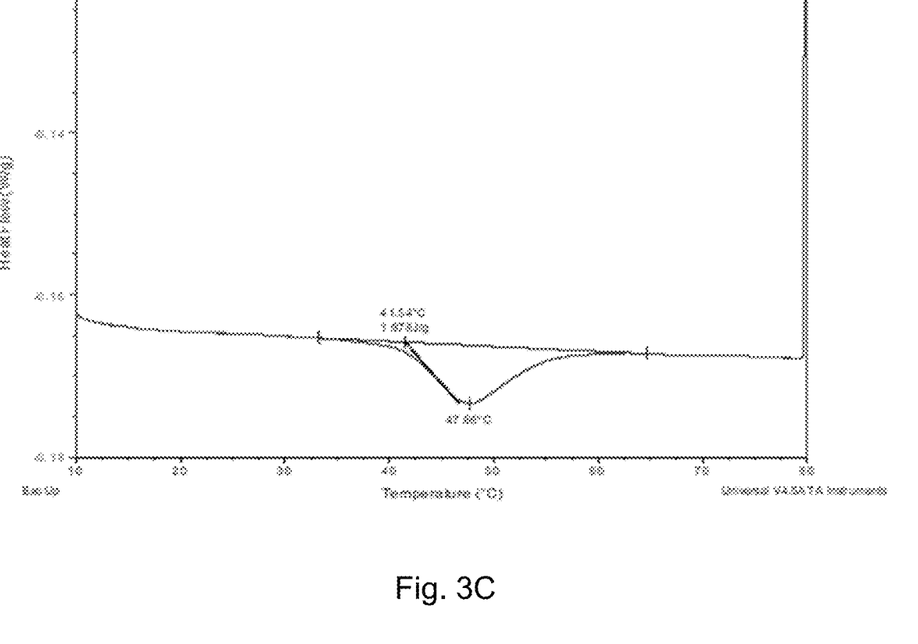
FIG. 3C is a graph showing the denaturation temperature using dipotassium phosphate in a long brining step.

Due at least in part to the higher denaturation temperature, as evidenced by FIG. 2, in comparison with FIGS. 3A-3C in relation to other salt solutions, provided by subjecting the collagen casing to the potassium lactate brine solution prior to the climate treatment, it was found that a superior casing can be achieved in combination with the dew point, humidity and time steps in the climate step.

Trial 1

Figure 4A:
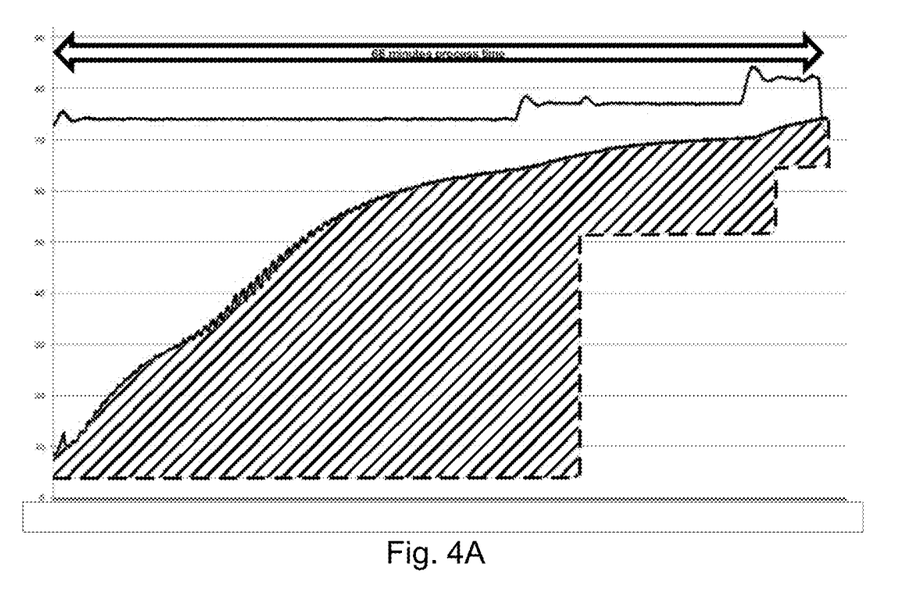
FIG. 4A is a graph of a first trial illustrating the relationship of temperature to time in a thermal treatment.

FIG. 4A illustrates a first trial showing the relationship between the parameters of the climate in the thermal treatment unit of the dew point of air to the temperature of the food dough, and more particularly defined based on the surface temperature of the food product and the dew point temperature relative to the denaturation temperature of the protein comprised in the casing of the food product. The dry bulb temperature is adjusted only slightly over time, causing the food product to be fully cooked at a specified core temperature, in this instance 74° C. The air velocity is maintained constant during the entire cooking period. The humidity (X) of the thermal treatment is increased as the dew point temperature is increased, thereby increasing the humidity in the thermal treatment.

The graph of FIG. 4A illustrates the onset temperature or denaturization temperature of the protein. The aim of setting the parameters of the dry bulb temperature, climate humidity and dew point temperature, and air velocity is to slowly increase at least the climate humidity and the dew point temperature so that the dew point of the air of the thermal treatment unit is equal to or lower than the determined denaturation temperature of the protein comprised in the casing of the food product.

Once the onset or denaturization temperature is reached, the cooking process of the food dough can proceed by maintaining and assuring good adherence of the collagen casing to the food dough without the casing blistering as the food dough is elevated in temperature to a suitable cooked core temperature. As the onset temperature or denaturization temperature is reached in the collagen, the collagen casing is sufficiently dried to permit further cooking of the food dough without any detriment to the casing adherence and appearance despite exposing the food product to higher temperatures. However, if the parameters are not met, as defined above, the casing runs the risk of being defective and cannot withstand more aggressive heat treatment of the food dough to cook it to suitable specifications.

Therefore, particularly, at early stages when the parameters are below the onset temperature, it is essential to keep the dew point temperature and humidity sufficiently low to enable the collagen to adhere to the food dough and sufficiently dry to the onset temperature, indeed such that the dew point of the air of the thermal treatment unit is equal to or lower than the determined denaturation temperature of the protein comprised in the casing of the food product.

FIG. 4A shows a scenario whereby the food product is subjected to an initial dry climate humidity of five grams of water to one kilogram of air (5 g/kg). The dew point temperature is substantially low at 3.9° C., with both humidity and the dew point temperature being sustained for a relatively long period. While in this scenario, the dew point temperature is maintained below the surface temperature of the food product, it is a time-consuming and expensive process since the humidity and dew point temperature must be maintained at a low point for a substantially sustained time increment, i.e., 40 minutes.

Figure 4B:
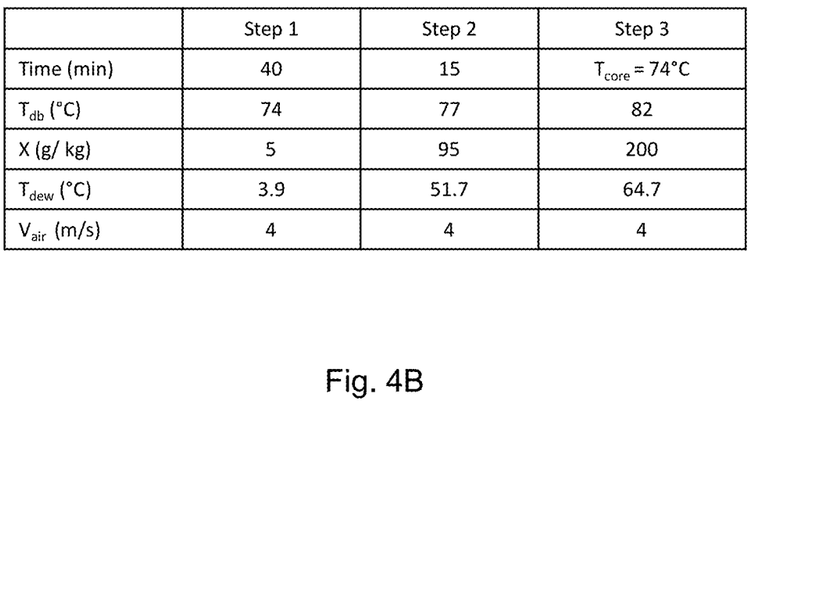
FIG. 4B provides a table with data and parameters used in the graph of FIG. 4A.

FIGS. 4A and 4B list the dry bulb temperature over three time steps, and the relationship of the temperature of the food dough to the dew point temperature, which is adjusted at each time step. It was found that by initiating a low dew point temperature over a sustained period of time and maintaining the dew point temperature less or at the surface temperature, in this instance the first step comprising 40 minutes, the physical state of the protein comprised in the casing offers a dried food product with appealing characteristics. While the first trial includes two subsequent steps of adjusting both the dry bulb temperature slightly in each step, the dew point temperature is significantly increased in the second step, and then less so in the third step, with the time increments of the second and third steps less than the duration of the first step. The first trial took approximately 68 minutes of processing time for the food products to reach their fully cooked state and includes a yield loss of 21.5%.

Figure 4C:
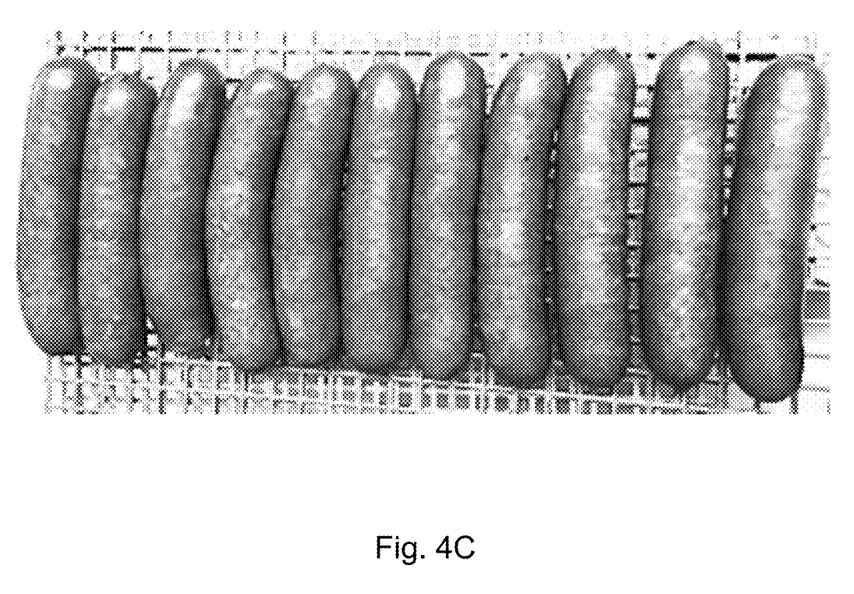
FIG. 4C is an exemplary view of the food product derived from the data and parameters used in the first trial.

As observed in FIG. 4C with the food products depicted therein, it was unexpectedly determined that food products having a casing comprising a protein or a hybrid casing of protein and polymer, the physical state of the protein can be controlled in a more sustainable and reliable way according to the parameters in the first trial, with the food product having the aforementioned appealing characteristics which fully cooking the food dough. Specifically, the critical parameters in the first trial of maintaining the dew point temperature equal to or lower than the denaturation temperature of the protein comprised in the casing leads to the food products having such appealing characteristics.

Trial 2

Figure 5A:
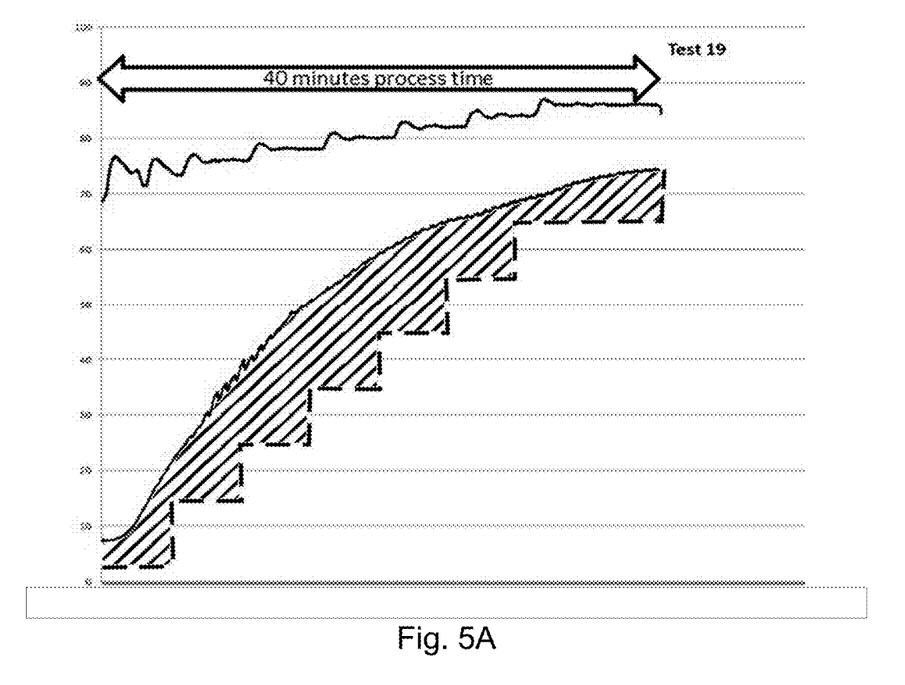
FIG. 5A is a graph of a second trial illustrating the relationship of temperature to time in a thermal treatment.

FIG. 5A illustrates a second trial showing the relationship between the parameters of the climate in the thermal treatment unit of the dew point of air to the temperature of the food dough, and more particularly defined based on the surface temperature of the food product and the dew point based on the denaturation temperature of the protein comprised in the casing of the food product determined when before, preferably shortly before, entering the thermal treatment unit. As in the first trial, the dry bulb temperature is adjusted incrementally over time, generally near or above the temperature to cause the food product to be fully cooked at a core temperature, in this instance 74° C. The air velocity is maintained constant during the entire cooking period.

Figure 5B:
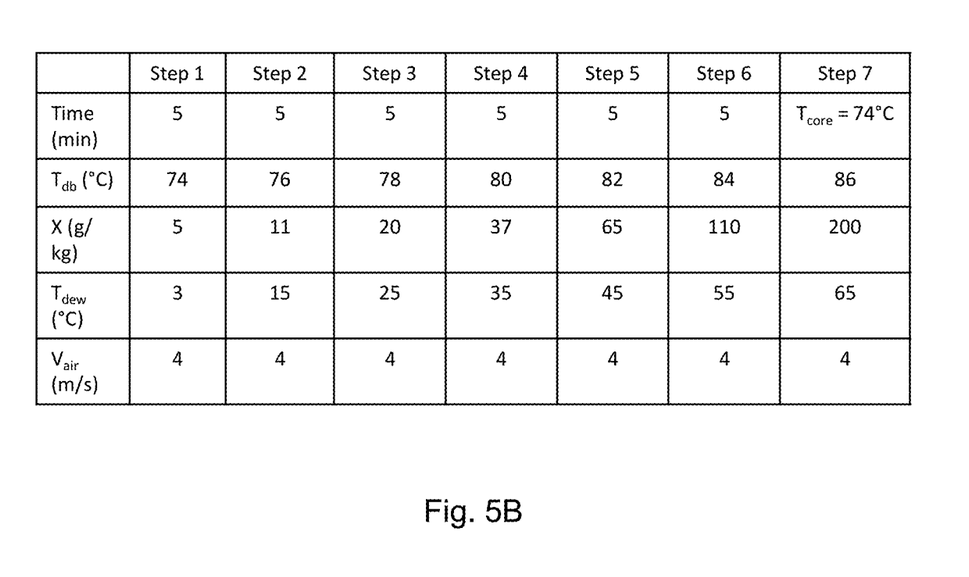
FIG. 5B provides a table with data and parameters used in the graph of FIG. 5A.

FIGS. 5A and 5B exemplify the dry bulb temperature as being advantageously more frequently adjusted than in the first trial, while maintaining the dew point temperature below the surface temperature of the food product. In this instance, by having more frequent time steps, while maintaining the critical relationship between the dew point and the surface temperature discussed above with the first trial, and correspondingly adjusting the dry bulb temperature in relation to the stepwise increase of the dew point temperature, the overall process time to reach the fully cooked state is advantageously reduced to 40 minutes over the 68 minutes, with a reduced of yield loss of 18.2%.

It will be observed in FIGS. 5A and 5B that the dew point temperature and humidity are increased in 5-minute steps or increments, while keeping them below the threshold below the onset temperature or denaturization temperature. Of course, the method is not limited to 5-minute increments, but it is shown that advantageously including frequent time steps combined with increases in dew point temperature and humidity, the process can be shortened over the first trial parameters. While the time steps and corresponding adjustments in dew point temperature and humidity are more frequently adjusted, such adjustments are below the above specified threshold and result in a climate dry enough to facilitate vaporization of water in collagen without detriment onset temperature is at least reached. Once the onset temperature is reached, more energy can be introduced to further cook the food dough to specifications.

Figure 5C:
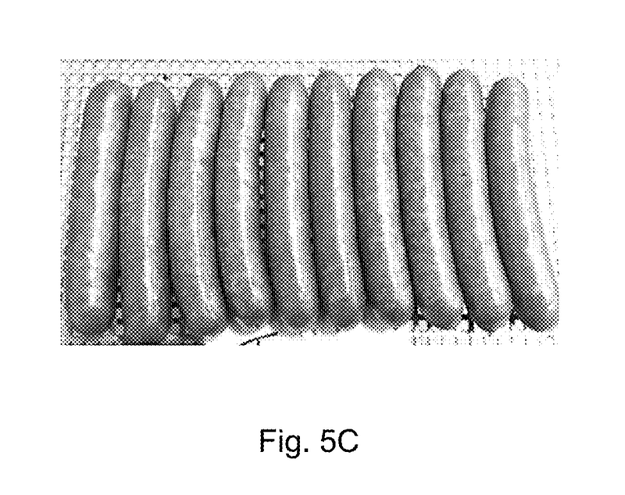
FIG. 5C is an exemplary view of the food product derived from the data and parameters used in the second trial.

As observed in FIG. 5C with the food products depicted therein, while the overall cooking time and yield loss was reduced, it was unexpectedly determined that food products having a casing comprising a protein or a hybrid casing of protein and polymer, the physical state of the protein can be controlled more sustainably and reliably according to the parameters in the first trial, with the food product having the aforementioned appealing characteristics which fully cooking the food dough. Specifically, the critical parameters in the second trial of maintaining the humidity and dew point temperature equal to or lower than the denaturation temperature of the protein comprised in the casing in more frequent time increments leads to the food products having such appealing characteristics while making the process quicker and more economically feasible.

Third Trial

Figure 6A:
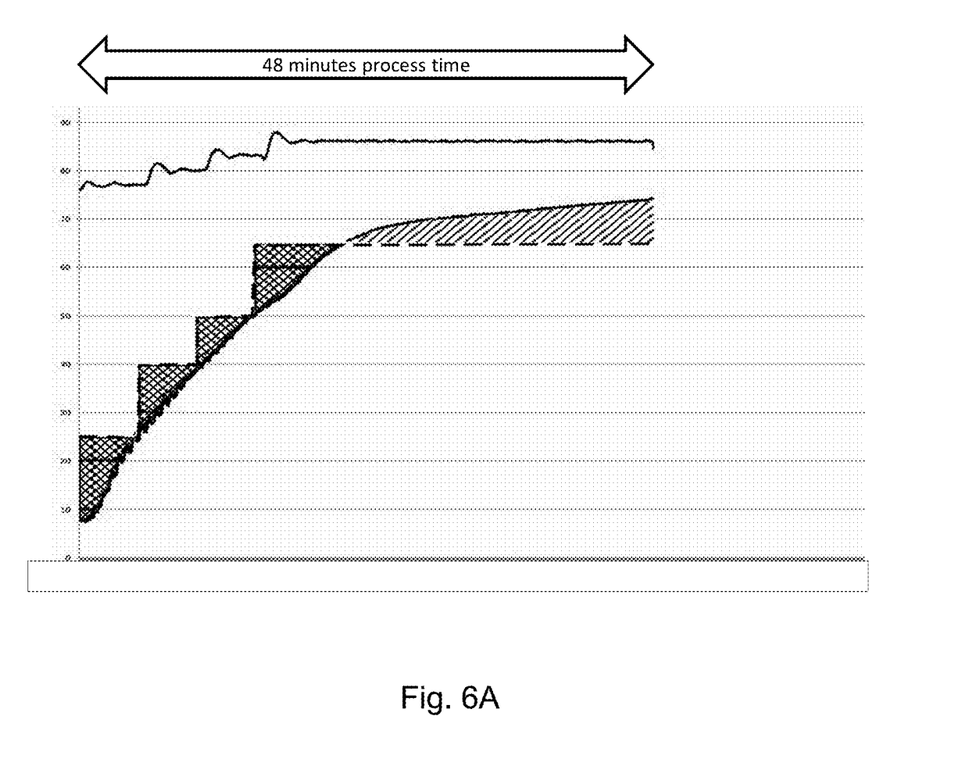
FIG. 6A is a graph of a third trial illustrating the relationship of temperature to time in a thermal treatment.
Figure 6B:
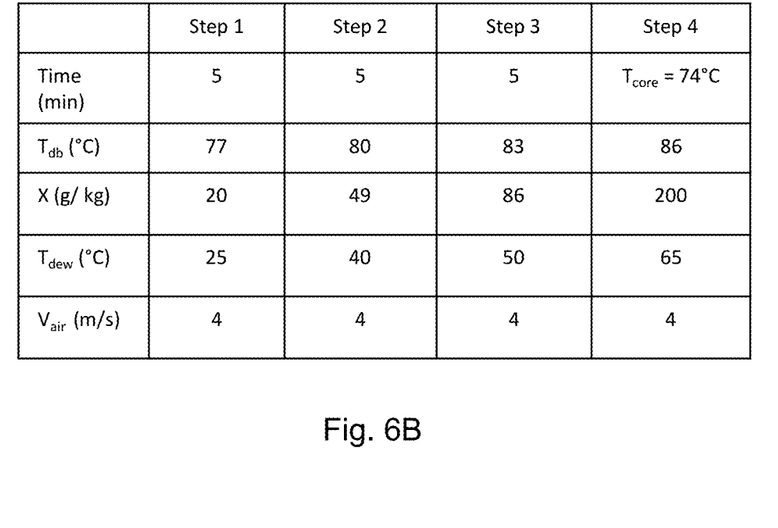
FIG. 6B provides a table with data and parameters used in the graph of FIG. 6A.
Figure 6C:
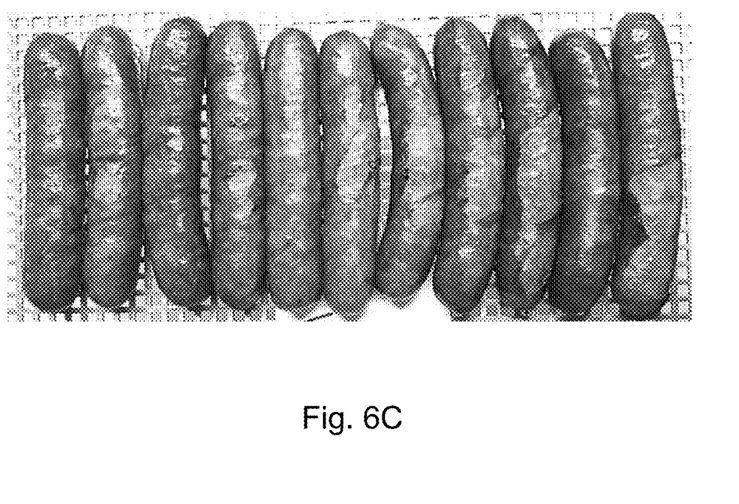
FIG. 6C is an exemplary view of the food product derived from the data and parameters used in the third trial.

FIGS. 6A-6C exemplify the risk that occurs when the dew point temperature is raised above the food product's surface temperature. As shown, in the first four time steps in 5-minute increments, the dew point temperature is raised well beyond the food product's surface temperature, thereby overshooting the prescribed advantageous and unexpected threshold of the surface temperature of the food product.

The first step started the dew point temperature at 25° C. with humidity at 20 g/kg compared to the relatively dry bulb temperature being much higher at 77° C., yet the surface temperature of the food product has a starting temperature of about 8° C. This creates an environment with a dew point and humidity rising too quickly, such that the casing runs the risk of not adhering to the food dough. Over time, when the food product is quickly exposed to a trajectory of harsher climate conditions before reaching the onset temperature and an elevated surface temperature, the collagen may become too wet and wash off the food dough. Therefore, from FIG. 6A, the trajectory of dew point and humidity is too aggressive as to moisture, creating a collagen casing that softens and becomes a gooey substance, thereby being unable to dry. While the dew point temperature is maintained for the remainder of the cooking time at 65° C. at the fourth step, roughly 23 minutes, at this stage the collagen casing has insufficiently dried, leading to an inferior product, depicted in FIG. 6C.

While a 48-minute process time is achieved until fully cooking the food dough, similar to that of the second trial, FIG. 6C exemplifies a food product that incurs blistering of the casing. According to the critical parameters of the invention set in the first and second trials, when the climate of the thermal treatment fails to meet the inventive relationship of dew point versus surface temperature throughout the cooking process, such blistering renders the food product unusable and negates the benefits obtained from the first and second trials.

Even with the great disparity of the dew point temperature versus the dry bulb temperature in the first step, the surface temperature of the food product was substantially less, around 8° C. From this observation of starting temperatures in the third trial in comparison to the first and second trials, the advantageous method of the invention exemplifies the unobvious step of always maintaining the dew point at our less than the surface temperature of the food product. Moreover, despite holding a dew point temperature for a sustained period, as in the fourth step, if the dew point ever exceeds the surface temperature of the food product, an inferior and possible defective food product may be obtained.

The invention claimed is:

1. A method for thermal treating a food product in a thermal treatment unit, the food product having a casing comprising a protein, or a hybrid casing of a protein and a polymer, wherein the method comprises the steps of:
providing the food product, comprising:
(i) co-extruding a strand of food dough and a casing enclosing the strand of food dough into a flow of the co-extruded food product; and
(ii) subjecting the flow of the co-extruded food product to a food product strengthening step, wherein the food product strengthening step comprises subjecting the flow of the food product to a brine solution;
conveying the food product into the thermal treatment unit; and
subjecting the food product to a thermal treating step, wherein the thermal treating step comprises:
a) drying the food product; and
b) subsequently, further thermal treating the food product, and
wherein the method further comprises the steps of:
before conveying the food product into the thermal treatment unit, determining a denaturation temperature of the protein comprised in the casing of the food product; and
setting parameters of climate in the thermal treatment unit such that dew point of air in the thermal treatment unit is equal to or lower than the determined denaturation temperature of the protein comprised in the casing of the food product,
wherein step a) ends when a surface temperature of the casing is equal to the dew point of the air of the thermal treatment unit;

wherein the further treating step b), directly following step a), comprises partially cooking or fully cooking the food product.

2. The method according to claim 1, wherein the further thermal treating step b) comprises one or more subsequent thermal treating steps.

3. The method according to claim 2, wherein the one or more subsequent thermal treating steps are selected from the group consisting of: heating, partially cooking, cooking, chilling, and cooling the food product,
wherein the one or more subsequent thermal treating steps of partially cooking and cooking the food product subsequently follow the further treating step b), directly following step a), of partially cooking the food product.

4. The method according to claim 1, wherein the further thermal treating step b) is performed in the same thermal treatment unit or a subsequent thermal treatment unit.

5. The method according to claim 1, wherein the method further comprises the step of:
after the thermal treating step, subjecting the food product to a post-thermal treating step,
wherein the post-thermal treating step is selected from the group consisting of chilling, surface treating, cooking and packing the food product;
wherein the post-thermal treating step of cooking the food product subsequently follows the thermal treating step of partially cooking the food product.

6. The method according to claim 5, wherein the post-thermal treating step of surface treating the food product comprises subjecting the food product to steam.

7. The method according to claim 5, wherein the post-thermal treating step of cooking the food product comprises cooking the food product after packing the food product.

8. The method according to claim 1, wherein the parameters of the climate include dry bulb temperature, wet bulb temperature, relative humidity, absolute humidity, and air velocity of the climate.

9. The method according to claim 1, wherein the denaturation temperature of the protein comprised in the casing of the food product is determined by performing a differential scanning calorimetry (DSC) measurement.

10. The method according to claim 1, wherein the parameters of the climate are adjusted based on changing climate conditions of the thermal treatment unit during performance of the thermal treating step and/or based on a changing denaturation temperature of the protein comprised in the casing of the food product during performance of the method.

11. The method according to claim 9, wherein climate conditions of the thermal treatment unit are measured by using one or more sensors selected from the group consisting of dry bulb temperature sensors, wet bulb temperature sensors, humidity sensors, and air velocity sensors.

12. The method according to claim 1, wherein
before subjecting the flow of co-extruded food product to the food product strengthening step, separating the flow of co-extruded food product into individual food products.

13. The method according to claim 1, wherein after subjecting the flow of co-extruded food product to the food product strengthening step, applying liquid smoke to the flow of co-extruded food product.

14. The method according to claim 1, wherein the step of determining the denaturation temperature of the protein comprised in the casing of the food product is performed after subjecting the flow of co-extruded food product to the food product strengthening step, and after a step of applying liquid smoke to the flow of the co-extruded strengthened food product.

15. The method according to claim 1, wherein the brine solution includes potassium lactate.

16. The method according to claim 1 further comprising, following the step of providing the food product, maintaining a physical state of the casing in a crystalline form.

17. The method according to claim 16, wherein the physical state of the casing is maintained by controlling pH of a viscous gelling agent forming part of the casing.

* * * * *